United States Patent [19]

Banning et al.

[11] Patent Number: 5,721,900
[45] Date of Patent: Feb. 24, 1998

[54] METHOD AND APPARATUS FOR GRAPHICALLY DISPLAYING QUERY RELATIONSHIPS

[75] Inventors: Kenneth Ray Banning; Wendy Sue James; Shih-Gong Li, all of Austin, Tex.

[73] Assignee: International Business Machines Corp, Armonk, N.Y.

[21] Appl. No.: 916,239

[22] Filed: Jul. 20, 1992

[51] Int. Cl.$^6$ .................................................. G06F 3/00
[52] U.S. Cl. ..................... 395/604; 395/613; 395/349; 395/968
[58] Field of Search .................... 395/155–161, 395/600

[56] References Cited

U.S. PATENT DOCUMENTS

| | | | |
|---|---|---|---|
| 4,068,304 | 1/1978 | Beausoleil et al. | 364/200 |
| 4,087,794 | 5/1978 | Beausoleil et al. | 364/900 |
| 4,449,186 | 5/1984 | Kelly et al. | 364/407 |
| 4,464,652 | 8/1984 | Lapson et al. | 340/710 |
| 4,477,880 | 10/1984 | Advani et al. | 364/900 |
| 4,527,250 | 7/1985 | Galdun et al. | 364/900 |
| 4,531,918 | 7/1985 | Coquil et al. | 434/118 |
| 4,556,954 | 12/1985 | Advani et al. | 364/900 |
| 4,601,003 | 7/1986 | Yoneyama et al. | 364/518 |
| 4,635,208 | 1/1987 | Coleby et al. | 364/491 |

(List continued on next page.)

FOREIGN PATENT DOCUMENTS 0491517  12/1991  European Pat. Off.  ........ G06F 15/40

OTHER PUBLICATIONS

Gerritson, "SQL Tutorial", DBMS, Feb. 1991, p. 44 (9).
Gerritsen, "Advanced SQL Queries", DBMS, Mar. 1991, p. 58(8).
Gerritsen, "SQL for Database Administrators", DBMS, Apr. 1991, p. 64(9).
Dunn, "SQL-Select Solutions", Data Based Advisor, Nov. 1991, p. 60(6).
Edelstein, "Relational vs. Object-Oriented", DBMS, Nov. 1991, p. 68(6).
Tsuda et al, "Iconic Browser", IEEE, 1989, pp. 130–137.
Hirakawa et al, "An Image Database System Facilitating Icon-Driven Spatial Information Definition and Retrieval", IEEE, 1991, pp. 192–198.
Sian et al, "Visual Database Interface for End User Computing", May 1992, IEEE, pp. 393–396.
Tan et al, "A Graphical Knowledge Level Approach for User-Database Interaction", IEEE, 1990, pp. 453–458.
IBM Tech. Discl. Bull., "Method of Detecting Atomic Bookan Factors", Oct. 1989, pp. 368–374.
Neill, "Introduction to Computer Science", 1979, West Publish. Co., pp. 305–336.
Czejdo et al, "Design and Implementation of an Interactive Graphical Query Interface", IEEE, 1988, pp. 14–20.

(List continued on next page.)

*Primary Examiner*—Raymond J. Bayerl
*Assistant Examiner*—John E. Breene
*Attorney, Agent, or Firm*—David A. Mims; Mark S. Walker; Keith Stephens

[57] ABSTRACT

A method, system and program for providing a graphical interface for a database are accomplished by the operation of a process in the memory of a processor. The definition of individual predicates, the definition of the relationship of predicates, the editing of predicates, and the editing of the relationship of predicates is simplified and rendered dynamic and interactive for the user thereby facilitating the completion of the task being performed. The user need not remember the related column information for a specified predicate because the system will provide that information simultaneously with the predicate definition in a form that supports the direct manipulation of the related information. The predicates and their relationship are displayed simultaneously with the definition activities for both the initial definition and any subsequent editing activities. The user may select this information and drag it to the desired location to proceed on the desired activity.

12 Claims, 7 Drawing Sheets

U.S. PATENT DOCUMENTS

| | | | |
|---|---|---|---|
| 4,642,790 | 2/1987 | Minshull et al. | 364/900 |
| 4,648,062 | 3/1987 | Johnson et al. | 364/900 |
| 4,656,603 | 4/1987 | Dunn | 364/900 |
| 4,686,522 | 8/1987 | Hernandez et al. | 340/709 |
| 4,689,737 | 8/1987 | Grant | 364/200 |
| 4,712,191 | 12/1987 | Penna | 364/900 |
| 4,763,356 | 8/1988 | Day, Jr. et al. | 379/368 |
| 4,815,029 | 3/1989 | Barker et al. | 364/900 |
| 4,821,211 | 4/1989 | Torres | 364/521 |
| 4,829,423 | 5/1989 | Tennant et al. | 364/200 |
| 4,843,538 | 6/1989 | Lane et al. | 364/188 |
| 4,853,843 | 8/1989 | Ecklund | 364/200 |
| 4,868,766 | 9/1989 | Oosterholt | 364/522 |
| 4,873,623 | 10/1989 | Lane et al. | 364/188 |
| 4,885,717 | 12/1989 | Beck et al. | 364/900 |
| 4,899,136 | 2/1990 | Beard et al. | 340/706 |
| 4,933,514 | 6/1990 | Bowers | 178/18 |
| 4,939,507 | 7/1990 | Beard et al. | 340/706 |
| 4,945,475 | 7/1990 | Bruffey et al. | 364/200 |
| 4,951,190 | 8/1990 | Lane et al. | 364/188 |
| 4,953,080 | 8/1990 | Dysart et al. | 364/200 |
| 4,984,152 | 1/1991 | Muller | 364/200 |
| 4,989,132 | 1/1991 | Mellender et al. | 364/200 |
| 4,996,654 | 2/1991 | Rosenow | 364/521 |
| 5,001,697 | 3/1991 | Torres | 364/521 |
| 5,040,131 | 8/1991 | Torres | 364/521 |
| 5,041,967 | 8/1991 | Ephrath et al. | 364/200 |
| 5,041,982 | 8/1991 | Rathnam | 364/443 |
| 5,088,052 | 2/1992 | Spielman et al. | 395/158 |
| 5,175,814 | 12/1992 | Anick et al. | 395/161 |
| 5,265,246 | 11/1993 | Li et al. | 395/600 |

OTHER PUBLICATIONS

Catarci et al, "Iconic and Pragrammatic Interfaces", IEEE, Oct. 1991, pp. 199–204.

Catarci et al, "Visual Strategies for Querying Databases", IEEE, Oct. 1991, pp. 183–189.

Staes et al, "A Graphical Query Language for Object–Oriented Databases" IEEE, Oct. 1991, pp. 205–210.

Gardarin et al, "Extending a Relational DBMS to Support Complex Objects", IEEE, Oct. 1989, pp. 131–137.

Rohr, "Graphical User Language for Querying Information", IEEE, Oct. 1988, pp. 21–28.

Burns et al, "A Graphical Entity–Relationship Database Browser", IEEE, Jan. 1988, pp. 694–704.

IBM TDB, "Visual Representation of Database Query Definition", vol. 33, No. 9, Feb. 1991, pp. 238–242.

IBM TDB, "Direct Manipulation Techniques for Row Conditions in Structured Query Language Query Objects", vol. 33, No. 3B, Aug. 1990, pp. 398–400.

IBM TDB, "User–Defined Logical Relationship in Visual Query", vol. 33, No. 6A, Nov. 1990, pp. 221–222.

IBM Technical Disclosure Bulletin, Interactive Schema Diagram to Visually Represent Tables of Related Data and Meaningful Joins Between Tables, vol. 33, No. 9, Feb., 1991, pp. 243–246.

METHOD AND APPARATUS FOR GRAPHICALLY DISPLAYING QUERY RELATIONSHIPS

FIELD OF THE INVENTION

This invention generally relates to improvements in database queries and more particularly to a graphical display of database queries for expressing the predicate of a WHERE clause.

BACKGROUND OF THE INVENTION

Databases have become the subject of significant recent interest, not only because of the increasing volume of data being stored and retrieved by computerized databases but also by virtue of the data relationships which can be established during the storage and retrieval processes.

Structured Query Language (SQL), and in particular ANSI SQL, has become a preferred language media for communicating queries to relational databases. As a consequence, there presently exist thousands of relational databases and thousands of related queries directed to such databases. Given an investment in such databases and queries, migration is not only a desirable feature, but a substantially necessary capability for new relational database systems and methods.

The concept of portraying a query in a graphical depiction on a display screen of a workstation is a relatively new approach to relational database interfacing. Visual queries, often referred to as graphical queries, utilize workstation graphics to represent query objectives heretofore defined by SQL statements. A visual query presents a pictorial depiction of the objectives of a search, thereby eliminating any need for a user to learn a query language, improving the rate at which SQL queries can be formulated, and reducing the defect or error rate of queries.

With the growing prevalence of relational databases, communication networks and workstations, the training and experience of a representative system user has decreased in relation to the resources available. The dilemma created by these various events is threefold. First, there exists an established and valuable base of queries formulated with classical SQL expressions. Second, there is a growing usage of relational databases and networks accessing their information. The end users of such databases are routinely less proficient in the very tools needed to efficiently and accurately access the relational database information. Finally, users of database access methods do not receive direct feedback of changes based on their manipulation of the database. Thus, a distinct need exists for methods, systems and programs which convert query statements into visual representations understandable by novice database users, and, in the compliment, which convert graphically or visually represented queries into SQL format statements usable in existing databases and network environments.

An article by Faloutos, F., and Sellis, T., entitled, "An Efficient Pictorial Database System for PSQL", *IEEE Transactions on Software Engineering*, Vol. 14, No. 5, May 1988, discusses a prior art technique for searching a K or B-tree database using efficient data structures for optimizing the search. The report discusses access techniques for retrieving information and displaying the information on graphical displays. For example, demographic information can be used to retrieve information and format it graphically to reflect population in various sections of the United States. An improvement to further optimize the access of data for subsequent graphic display is disclosed in U.S. Pat. No. 4,905,163 and IBM Technical Disclosure Bulletin Vol. 30, No. 1, June 1987, *Intelligent Scheduling, Query and Reporting Data Base*.

An example of a dynamic, graphical display for a knowledge base application is found in U.S. Pat. No. 4,752,889 to Neuron Data. The patent discloses a graphical tree structure depiction of a knowledge base that is updated after changes are made to the database via user line commands.

In the prior art there are various programs that allow a user to define WHERE clause predicates. For example, users have access to programs for defining SQL queries that includes the WHERE clause. This input is a text string in a separate panel, or a string in the flow of the entire query command text. Users may enter the command language text in either form.

All known current approaches have several deficiencies. First, the predicate definition is not initiated by the direct manipulation of the column object. Second, the resulting predicate is not immediately displayed in relation to the other defined predicates. Third, the predicate is not displayed simultaneously with an indicator for the table column to which it relates. Fourth, the predicate is not displayed in graphical form. Fifth, the predicates themselves are not accessible for direct manipulation. Sixth, the column information is not displayed simultaneously with the predicate information.

The impact of these problems with current implementations is that extra time is required for users to define predicates. The inaccessibility of the related information causes delays and errors because human memory is relied upon to replicate information that is already known to the system. The set of predicates in a disjointed text string cause errors because the user cannot discern if the defined predicates will produce the desired condition. The current approaches do not aid the user in the performance of the action desired; i.e., the definition of predicates in the row conditions to achieve a desired subset of database records.

SUMMARY OF THE INVENTION

Accordingly, it is a primary object of the present invention to provide a unique method and system for the visual presentation of database information using a graphical display and provide direct manipulation of a screen object.

These and other objects of the present invention are accomplished by the operation of a process in the memory of a processor. The definition of individual predicates, the definition of the relationship of predicates, the editing of predicates, and the editing of the relationship of predicates is simplified and rendered dynamic and interactive for the user thereby facilitating the completion of the task being performed. The user need not remember the related column information for a specified predicate because the system will provide that information simultaneously with the predicate definition in a form that supports the direct manipulation of the related information. The predicates and their relationship are displayed simultaneously with the definition activities for both the initial definition and any subsequent editing activities. The user may select this information and drag it to the desired location to proceed on the desired activity.

The benefits of the invention include enhanced user performance on the row condition task by having direct manipulation of the related column to initialize the task. The user is also supported for direct manipulation of the sub-tasks that comprise the predicate definition task. The user can see the relationship of the several predicates in a simple to understand graphic form making the system easier to use.

The user is not required to memorize information that can be provided by the system. This makes the system easier to use by both novice and experienced users, and no matter what the skill level of the user, errors are reduced as a results of the graphical interface which provides only the valid operations for selected objects.

These and other objects of the present invention are accomplished by the operation of an algorithm in the memory of a processor. The processor accesses data structures to determine the current status of a database and displays the logical relationships of the information stored in the database graphically. A user employs a pointing device to select and change portions of the database and its logical relationships via the graphic user interface. The selection and changes are dynamically applied to the relational database via modifications to the underlying data structures and reflected graphically on the display. Additional, dynamic data structures, called presentation objects are created based on user created information defining relationships, new tables, groups, constraints, row conditions, having conditions, SQL statements, categories and sets of existing database information. The dynamic data structures can ultimately become part of the original database. The method, system and program is comprehensive in dynamic creation of data structures called presentation objects for use in the direct manipulation and change of a database.

DETAILED DESCRIPTION OF THE INVENTION

Figure 1A:
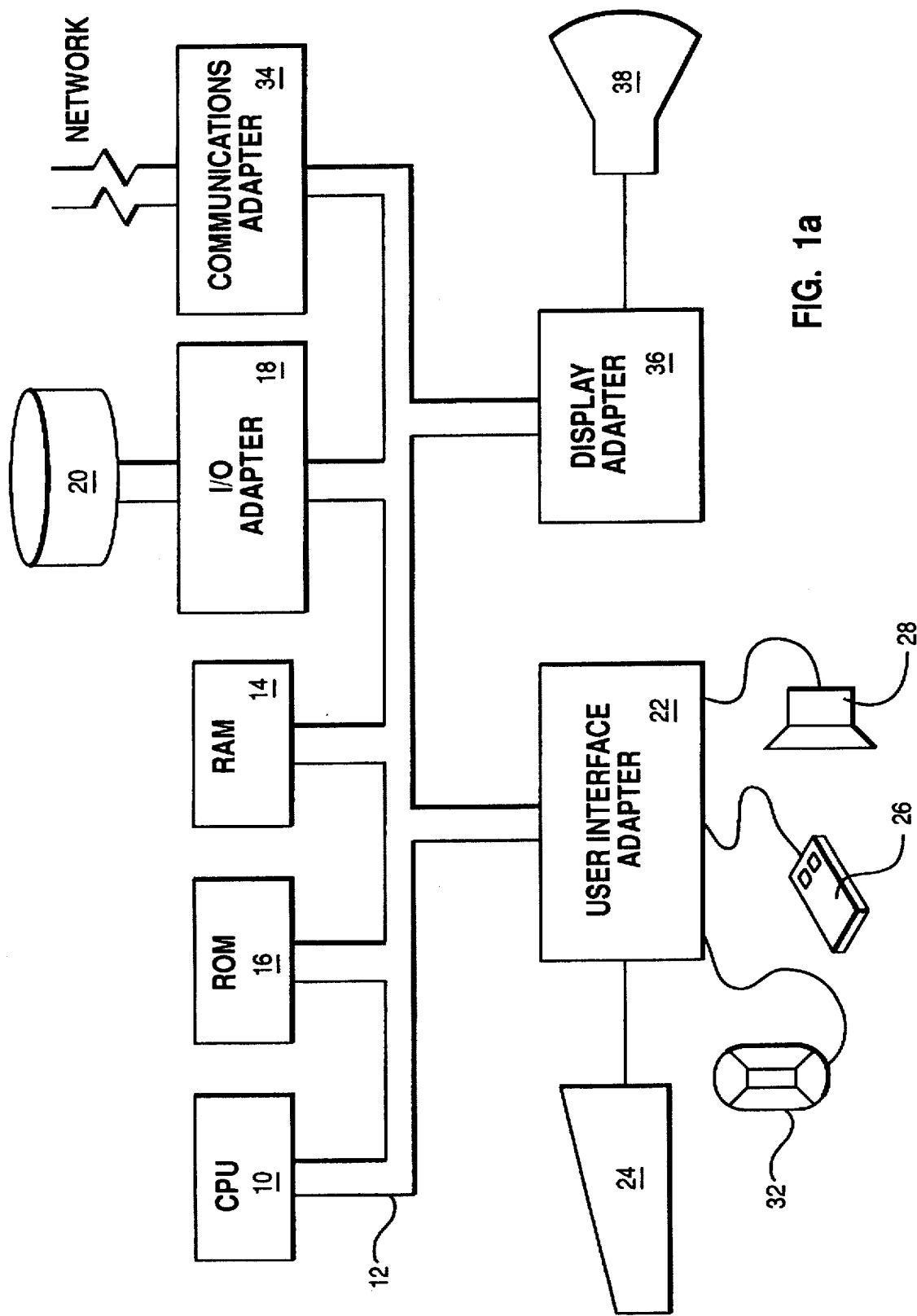
FIG. 1a is a block diagram of a personal computer system in accordance with the subject invention.

Queries which obtain information from relational databases are conventionally defined with ANSI standard Structure Query Language (SQL) statements. These statements define in computer recognizable terms the tables from which the data is to be extracted, the columns of interest, the conditions rows must satisfy, what columns are to be included, how the select columns are to be grouped, the order of the columns, distinctiveness constraints in the columns, connections of data within tables, and lower level or subqueries to be integrated into the base queries. A simple text describing SQL and its uses appears in the IBM Operating Systems/2 Extended Edition Database Manager Structured Query Language (SQL) Concepts booklet published by IBM Corporation in 1991. In addition to the ANSI standard SQL statements, there exist a number of nonstandard SQL statements within the relational database community. Thus, any bidirectional translation resource must have the diversity of structure to interface a broad spectrum of relational database SQL language variances.

As noted earlier, comprehensive bidirectionality of the translation is important from the perspective of migrating from established SQL queries to their graphical or visual query equivalents. It is inefficient to require the regeneration of existing SQL queries into the visual environment. At the same time, new visual queries should be available in SQL format for use on existing hardware with existing relational databases. Comprehensive bidirectionality and direct manipulation via a graphical display is lacking in the prior art.

Some technologies do exist for providing very limited translation from SQL to a visual or graphical depiction. Representative examples are described in "Graphical User Languages for Querying Information: Where to look for criteria?" by Hrohr, as published in 1988 *IEEE Workshop On Visual Languages,* May 1988, pages 14–20; "Design and Implementation of An Interactive Graphical Query Interface for a Relational Database Management System" by Czejdo et al, as appeared in 1988 *IEEE Workshop On Visual Languages,* May 1988 pages 21–28; and "End-User Access to Relational Databases Metaphor Database Server" by Benjamin et al, as appeared in the summer 1987 issue of InfoDB.

Unfortunately, the translations described in such publications were lacking both in comprehensive bidirectionality and scope of diversity. Namely, the focus was only directed toward translating from SQL to visual or graphical depictions. Furthermore, the translations were not ANSI standard SQL comprehensive, in that the row condition was incapable of handling diverse logical relationships, no mathematical relationships were permitted for column data, and subquery handling was absent. None of the teachings even remotely suggested the ability to directly manipulate a database directly from the graphic display.

The article "User Interfaces for Structural Engineering Relational Database" by Howard et al as appeared in *Engineering With Computers,* 1988, pages 239–249, recognized the importance of bidirectional translation between a text based query, the defined Engineering Query Language and graphical representations. However the article did not disclose how such desirable objectives could be accomplished. The article recognized the potential need for translating relatively complex query formulations and applying them directly from a graphical interface to a database, but made no attempt to present a solution. In contrast, the present invention defines a method, system and program for accomplishing these desirable goals and doing so with the resources to handle complex formulations, including, but not limited to, the definition of complex logical and algebraic relationships between columns and the manipulation of hierarchical queries composed of subqueries.

The invention is preferably practiced in the context of a relational database such as is available in the OS/2 Extended Edition software program available from IBM Corporation. A representative hardware environment is depicted in FIG. 1a, which illustrates a typical hardware configuration of a workstation in accordance with the subject invention having a central processing unit 10, such as a conventional microprocessor, and a member of other units interconnected via a system bus 12. The workstation shown in FIG. 1a includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communications adapter 34 for connecting the workstation to a data processing network and a display adapter 36 for connecting the bus to a display device 38.

Figure 1B:
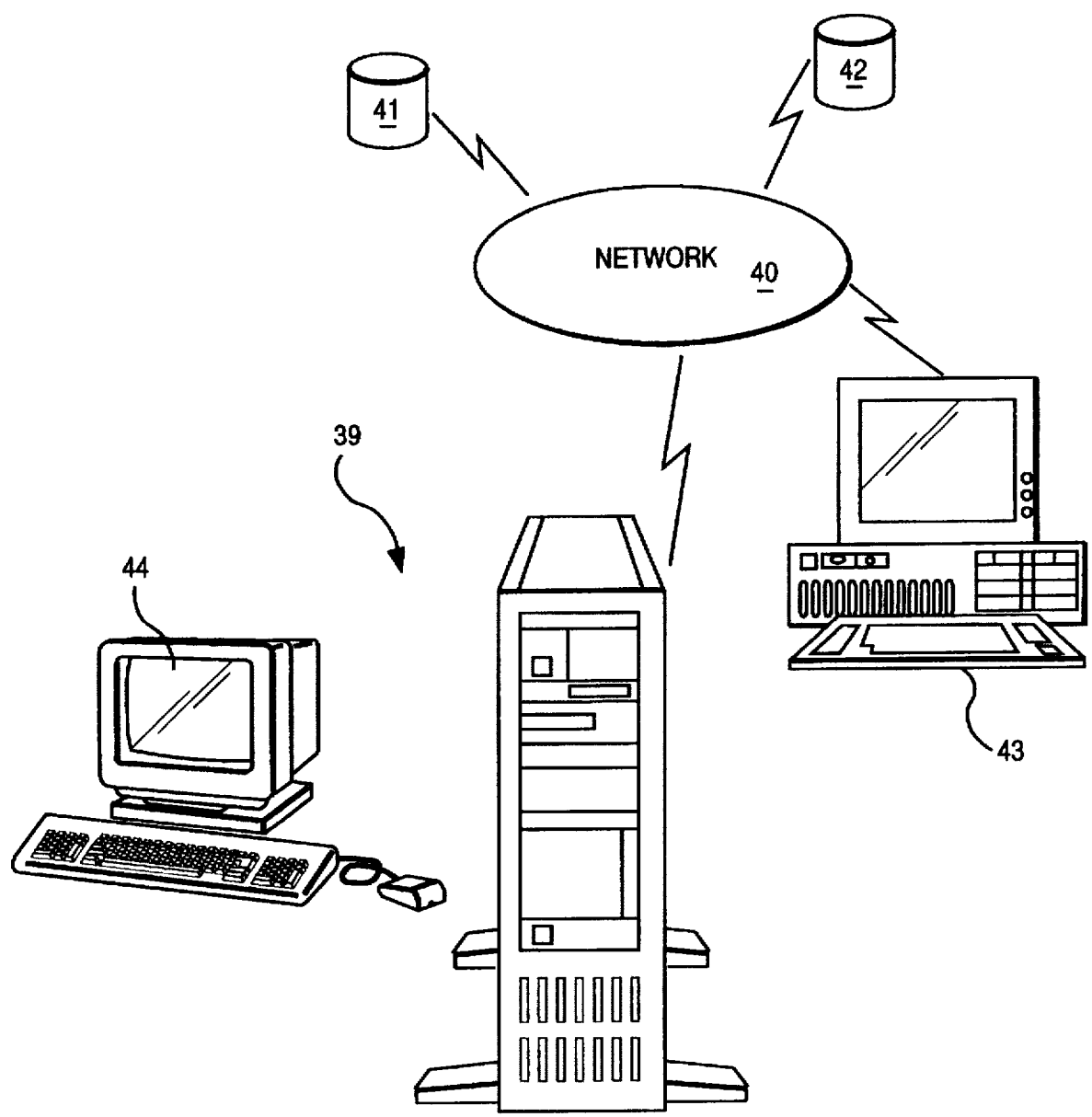
FIG. 1b schematically depicts a workstation connected to a network with a relational database in accordance with the subject invention.

A network of workstations, including an IBM brand PS/2 workstation, is illustrated in FIG. 1b, having resident thereon the OS/2 Extended Edition base operating system and the aforementioned OS/2 Extended Edition relational database program. Workstation 39 includes nonvolatile storage for the database, such as a hard disk, optical disk or tape drive media, and means for communicating into a network, generally at 40, having attached thereto further databases 41 and 42 as well as distinct non-proximate workstations such as 43. The fundamental goal is to provide a relatively inexperienced relational database user of workstation 39 with a method, system and program resources to create, modify and execute relational database queries encompassing a broad and historical base of information. The invention further contemplates that preexisting queries formulated in classical SQL format be conveyed to workstation 39 and subjected to conversion into visual or graphical queries equivalent for display on a graphic display 44. The user thereafter refines the query, executes the query and dynamically views the results on the graphic display.

A basic tenet of the user interface architecture for Structured Query Language (SQL) queries is that unlike the computer with it's mathematical language and rigid parsing rules, humans use categories to organize information and understand relationships between objects. An object is any actual entry in a relational database. The information necessary for the computer to perform a query of a relational database using SQL is visually structured into related objects with the text representing the objects of interest and the graphical representation of these objects depicting the relationships that exist or are of interest to the requester. The reader is referred to IBM's *SQL REFERENCE*, SC26-4380 (1989) for a detailed description of statements in the Structured Query Language (SQL). These statements include create, alter, and drop objects; retrieve, insert, update, and delete data in them; and grant and revoke privileges over them. The publication gives a complete description of all SQL elements and an alphabetic list of all SQL statements implemented by IBM, with descriptions of their syntax, options, and effects.

Relational database queries may require row conditions to specify the data records that should be included in a report. The row condition is composed of a set of logically linked predicates. Usually in defining predicates for the row condition, the user needs to have a list of table information on hand and then types the predicates in a flat textual form. In the present invention, by providing a graphical user interface for defining queries, table objects can be displayed in graphical form. Each column of a table is a directly manipulable object displayed in the client area of the table object window. Through a mechanism composed of direct manipulations and a dialog box, predicates can be defined against a column or a combination of columns. After each predicate is defined, it is immediately put into an independent window, the row condition window, and displayed with the previously defined predicates. In the row condition window, predicates and the logical relationships among them are shown in graphical form. By graphically displaying the row condition window and the table windows simultaneously, the present invention allows a user to view the defined predicates together with the referenced columns.

Figure 2:
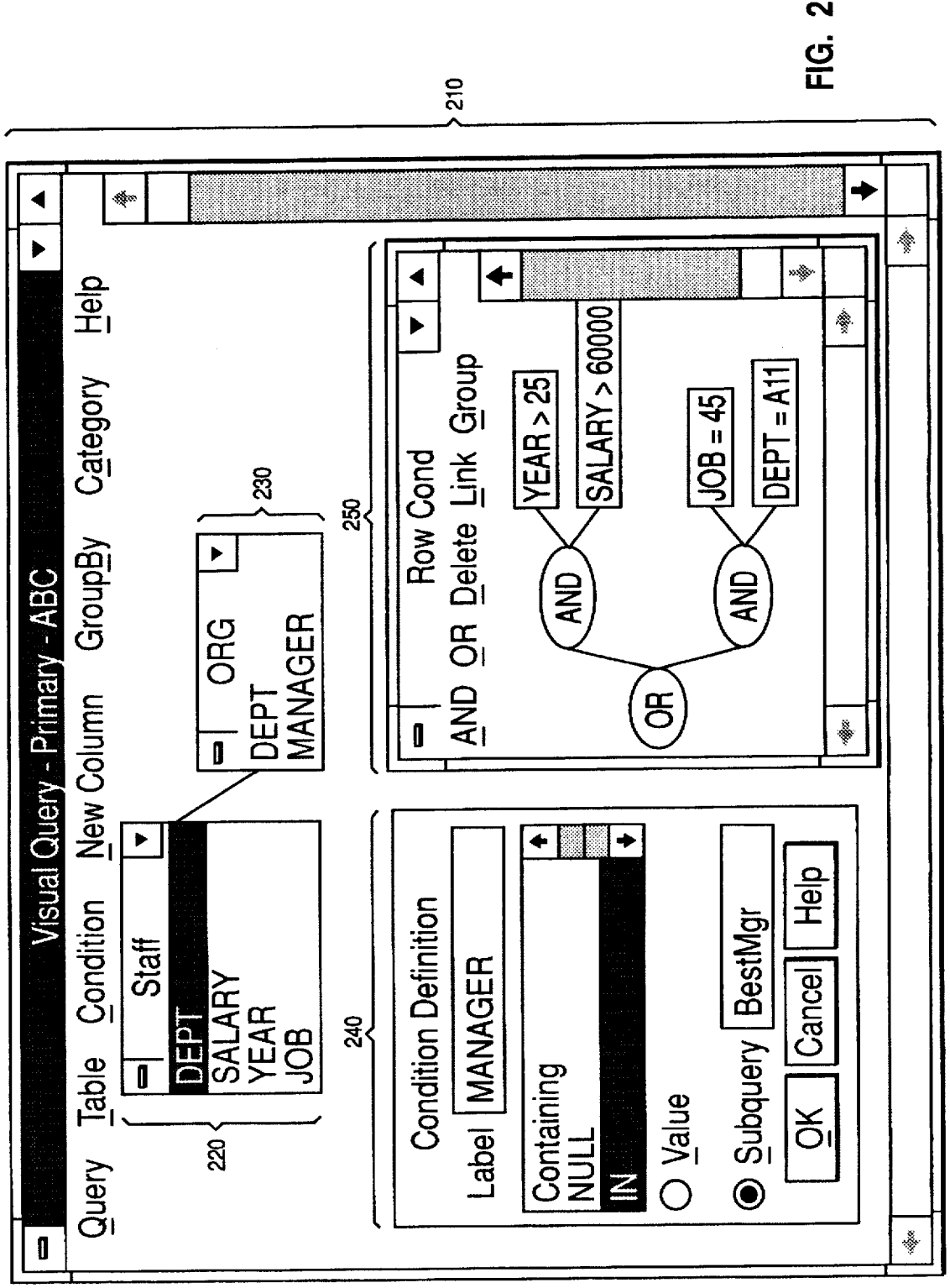
FIGS. 2 and 3 are illustrations of visual query displays in accordance with the subject invention.

FIG. 2 shows a user interface design of Visual Query that a new predicate will be defined through a dialog box. In FIG. 2, the Visual Query—Primary—ABC 210 is the primary window for defining a query. The Staff 220 and ORG 230 are windows of tables referenced in a SQL query definition. The contents of each table window is the list of columns belonging to the table. Initially, the Row Condition Window 250 is invisible. It becomes visible after the first predicate is defined. The contents in the Row Condition Window show the defined predicates and their relationships (in Boolean logic). The user can examine the information displayed in the Row Condition Window 250 and the table windows 220, 230 to choose the column names for defining more predicates to build the row condition (Where condition). The user can double click a column entry in a table window to define a predicate based on the column. When a column entry is double clicked, a dialog box, such as the Condition Definition dialog box 240 shown in FIG. 2, will be displayed for defining a predicate against the column. After the user commits the Condition Definition dialog box 240, the dialog box is closed and the newly defined predicate will be displayed in the Row Condition Window 250.

Figure 3:
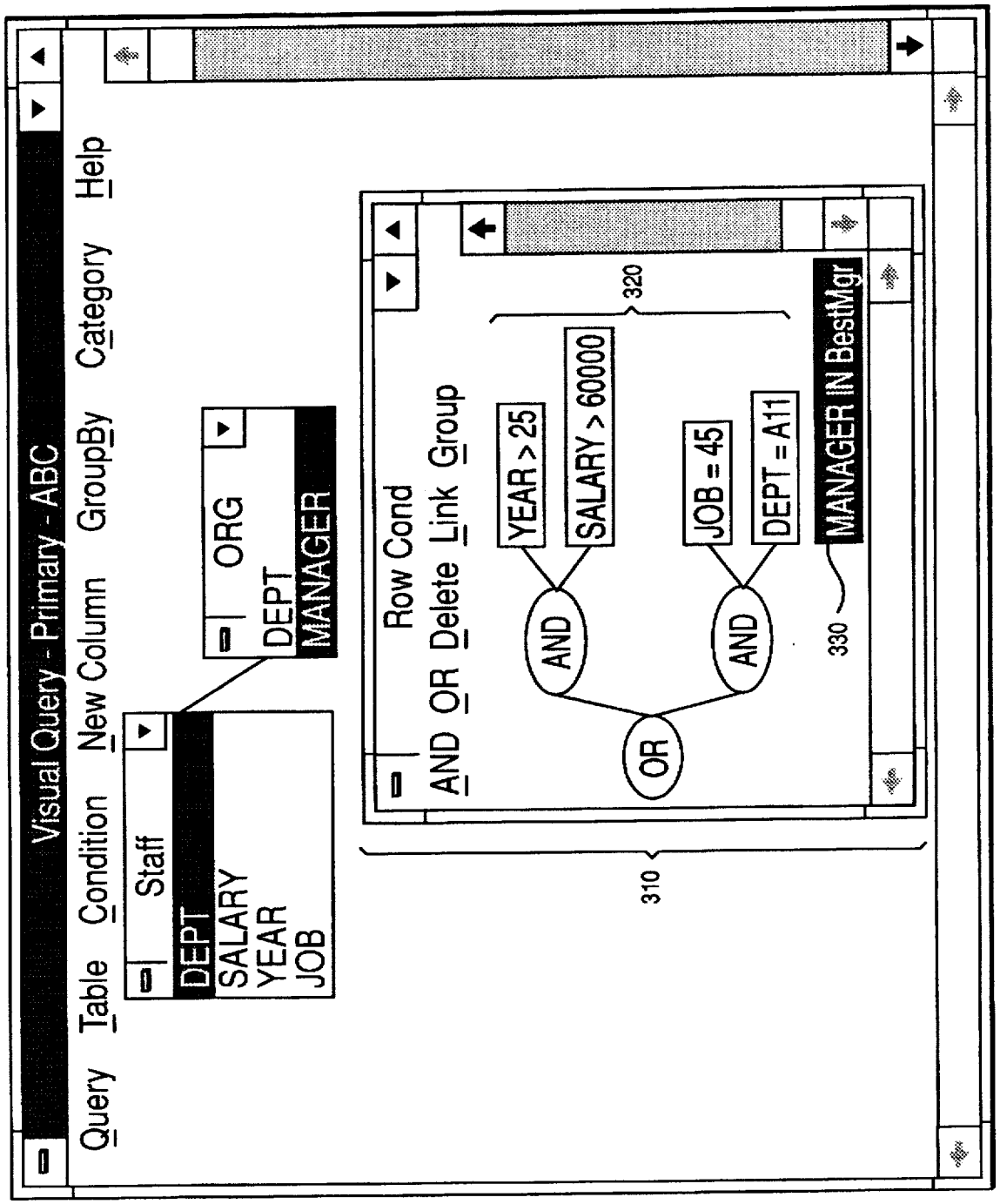

FIG. 3 shows the screen display after the user commits the dialog box 240 shown in FIG. 2. The newly defined predicate MANAGER in BestMgr 330 is displayed with the previously defined predicates 320 in the Row Condition Window 310. Note that the newly defined predicate 330 is not linked with any other predicate yet. After the predicate 330 is displayed, the user can then specify its link relationships with the other predicates shown in the Row Condition Window.

In the present invention, predicates are defined by directly manipulating the column objects and the results are immediately displayed in the row condition window. By putting all the defined predicates together in the row condition window, the predicates can be grouped and linked by direct manipulations to define the final row condition. Furthermore, the table objects (including its columns) and the defined predicates are displayed in graphical form simultaneously on the screen. Whenever a predicate is manipulated in the row condition window, the information of column objects are available on the screen. This invention provides the user a decision aid in both defining new predicates and modifying existing predicates.

Pseudo Code In Accordance With The Subject Invention

The pseudo code that follows portrays the detailed logic of the subject invention.

Pseudo Code In Accordance With The Subject Invention

The pseudo code that follows portrays the detailed logic of the subject invention.

```
5       /* Double Clicking on a Column Name in a Table window */
        response to Double_Click(Column)
           /* identify the column object              */
           /* transfer the column object's full name
                into DlgLbl */
10         copy object.Table to XTbl
           copy object.Column to XClmn
           copy "Xtbl.Xclmn" to DlgLbl
           /* call the procedure for defining predicates */
           call PCondDefProc(DlgLbl)
15         Return subroutine PCondDefProc(DlgLbl) is
           /* Dialog Box Initialization */
           copy DlgLbl to Label
20         copy 1 to Operator
           copy "" to RhsValue
           copy "" to RhsSub
           copy 120 to XP
           copy 40 to YP
25         copy false to DidOKDlg
           /* Call the procedure to open the dialog box for defining a predicate */
           call OpenDialogBox2(XP,YP,Label,Operator,RhsValue,RhsSub)
           if (DidOKDlg) then
              /* A predicate has been defined thru committing the dialog box */
30            /* Get the text for the chosen comparison operator */
              call GetTOP(Operator,TOP)
              /* Build the text for the defined predicate */
              copy Label to PTObj
              append TOP to PTObj
```

```
            if (not(RhsValue="")) then
                append RhsValue to PTObj
            else
                append RhsSub to PTObj
 5          end if
            /* Prepare for displaying the defined predicate */
            /* TempL is the number of characters in */
            /* the text of the defined predicate    */
            copy length of PTObj to TempL
10          copy (8*TempL) to TempL
            /* Ipred is the next available index for a predicate */
            /* Assign this newly defined predicate with index Ipred */
        /* and store the predicate's information for subsequent operations */
            copy Label to L[Ipred]
15          copy Operator to O[Ipred]
            copy RhsValue to V[Ipred]
            copy RhsSub to S[Ipred]
            /* Determine the screen location for displaying this predicate */
            Find a screen location (XP,YP) in the Row Condition window
20          /* PObj is a defined object for displaying predicate */
            /* in the Row Condition window */
            change PObj position to XP YP
            /* Prepare PObj for displaying on the screen */
            enable PObj
25          make PObj parameter PTObj
            make PObj black
            change graphics PObj to
                box TempL 9
                move to 0 1
30              text PTObj
            if (First) then
                /* First is a boolean variable initially TRUE */
                /* The Row Condition window becomes visible   */
                /* after the first predicate is defined       */
35              make ConnWindow visible
                copy false to First
```

```
            end if
            make PObj visible
            /* Initially, the default is to link all defined predicates by AND */ if (Default) then
 5              /* ANDCon is a predefined object representing */
                /* the root AND operator in the Row Condition window */
                make ANDCon visible
                /* Create an object to link the display of */
                /* the defined predicate and ANDCon object */
10              copy the coordinate of the right middle corner of ANDCon to
                    (XL,YL)
                copy the coordinate of the left middle point of PObj to (XR,YR)
                change LinkObj position to XL YL
                change graphics LinkObj to
15                  line (XR-XL) (YR-YL)
                /* Display the link line in black */
                make LinkObj black
                make LinkObj visible
            end if
20      Return subroutine OpenDialogBox2(integer:XP, integer:YP,string:Label,
                    integer:Operator,string:RhsValue,string:RhsSub) is
            copy false to DidOKDlg
25          call ProcessDialogBox2( DidOKDlg )
            Return subroutine ProcessDialogBox2( boolean : DidOKDlg ) is
            begin guarded
30              response to start
                    /* cursor's initial position in Label entry field */
                    copy 0 to CursorValue
                    make DialogBox2 visible
                    /* Display the dialog box according to */
35                  /* the predefined initial values */
```

```
            call SetupDialogBox2( Label, Operator, RhsValue,RhsSub )
            /* set up the right radio button */
            if (RhsSub="") then
                check Value
 5              make RhsVaKey visible
            else
                check Subquery
                make RhsSubKey visible
            end if
10         response to Value
                /* indicate the last cursor position was in Value */
                copy 1 to CursorValue
                make RhsVaKey visible
                make RhsSubKey invisible
15         response to Subquery
                /* indicate the last cursor position was in Subquery */
                copy 2 to CursorValue
                make RhsSubKey visible
                make RhsVaKey invisible
20         response to Single_Click(Column)
                /* single click on a column name */
                copy Object.Column to Temp
                Do Case
                    Case CursorValue = 0
25                      /* if last cursor position in Label field */
                        copy text of LabelKey in DialogBox2 to TempText
                        append Temp to TempText
                        change LabelKey in DialogBox2 text to TempText
                    Case CursorValue = 1
30                      /* if last cursor position in Value field */
                        change RhsVaKey in DialogBox2 text to Temp
                End Case
            response to Drag_drop(QueryIcon, Subquery)
                /* Drag a query icon and drop in the Subquery entry field */

35          copy Object.Query to Temp
```

```
            change RhsSubKey in DialogBox2 text to Temp
        response to OK in DialogBox2
            call QueryDialogBox2(Label,Operator,RhsValue,RhsSub)
            copy true to DidOKDlg
            make DialogBox2 invisible
            leave block
        response to Cancel in DialogBox2
            copy false to DidOKDlg
            make DialogBox2 invisible
            leave block
    end
    Return subroutine SetupDialogBox2( string : Label, integer : Operator,
    string : RhsValue, string : RhsSub ) is
    change LabelKey in DialogBox2 text to Label
    select line Operator in OpKey in DialogBox2
    change RhsVaKey in DialogBox2 text to RhsValue
    change RhsSubKey in DialogBox2 text to RhsSub
    if ( RhsSub="" ) then
        make RhsSubKey invisible
    else
        make RhsVaKey  invisible
    end if
    Return subroutine QueryDialogBox2( string : Label, integer : Operator,
    string : RhsValue, string : RhsSub ) is
    copy text of LabelKey in DialogBox2 to Label
    copy ( selected line from OpKey in DialogBox2 ) to Operator
    if (Value is checked) then
        copy text of RhsVaKey in DialogBox2 to RhsValue
        copy "" to RhsSub
    else
        copy text of RhsSubKey in DialogBox2 to RhsSub
        copy "" to RhsValue
``` end if
Return

Flowchart in Accordance With the Subject Invention

Figure 4:
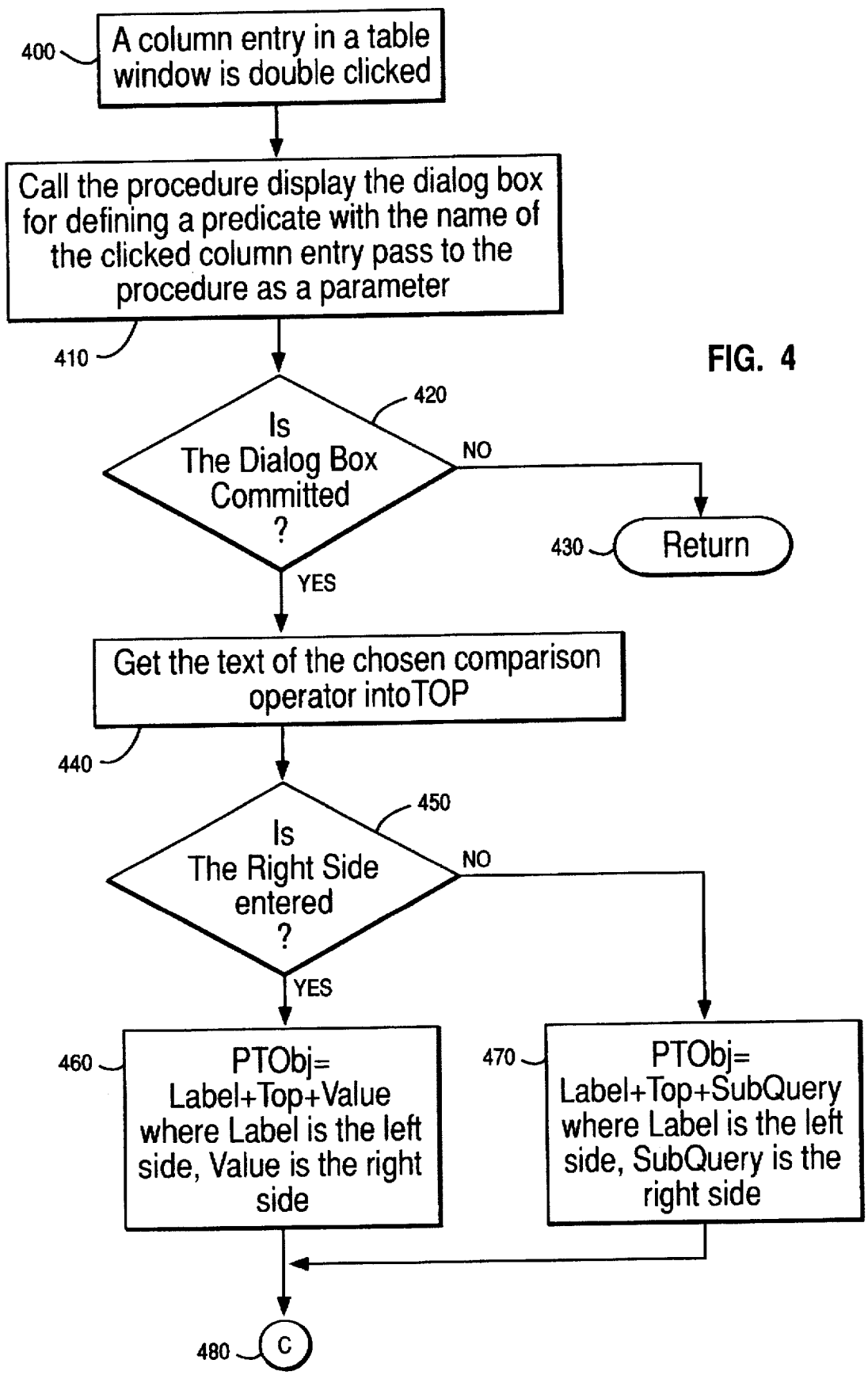
FIGS. 4, 5 and 6 are detailed flowcharts in accordance with the subject invention.
Figure 5:
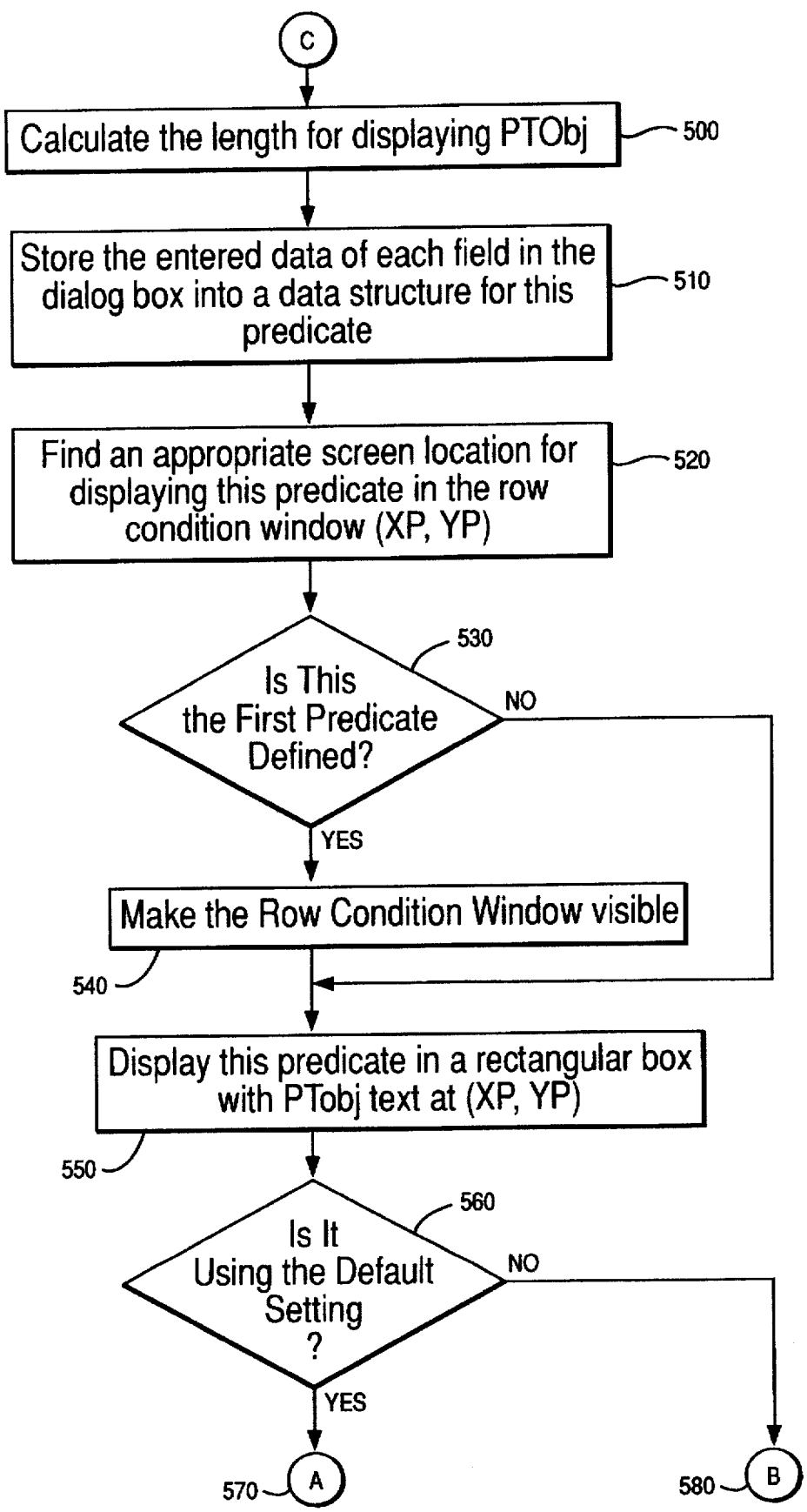
Figure 6:
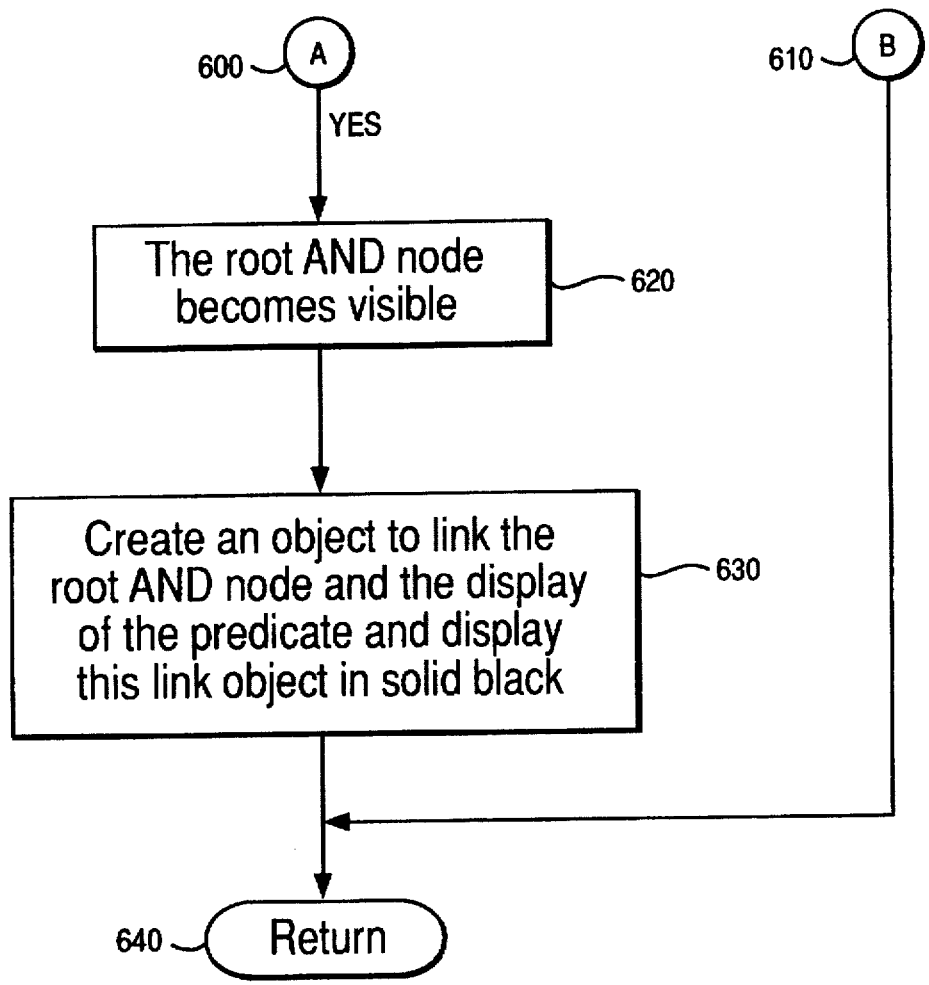

Figures 4, 5 and 6 are detailed flowcharts in accordance with the subject invention. Processing commences at function block 400 when a column entry is selected. Then, in function block 410 a dialog box is created for the selected column entry and a test is performed at decision block 420 to determine if the dialog box is committed. If not, then control is returned at terminal 430. If the dialog box is committed, then the text of the selected comparison operation is obtained at function block 440 and another test is performed at decision block 450 to determine if the right side has been entered. If not, then control is passed to function block 470 where a pointer object is initialized. If the right side has been entered, then the pointer object is initialized to the right side in function block 460.

Regardless of which side has been selected, control is passed via label 480 to function block 500 of Figure 5 where the length for displaying the pointer object is calculated. Function block 510 stores the entered data of each field in the dialog box, function block 520 locates an appropriate screen location for displaying the predicate, and a test is performed at decision block 530 to determine if the first predicate has been defined. If this is the first predicate, then the row condition window is presented in

Flowchart in Accordance With the Subject Invention

FIGS. 4, 5 and 6 are detailed flowcharts in accordance with the subject invention. Processing commences at function block 400 when a column entry is selected. Then, in function block 410 a dialog box is Created for the selected column entry and a test is performed at decision block 420 to determine if the dialog box is committed. If not, then control is returned at terminal 430. If the dialog box is committed, then the text of the selected comparison operation is obtained at function block 440 and another test is performed at decision block 450 to determine if the right side has been entered. If not, then control is passed to function block 470 where a pointer object is initialized. If the right side has been entered, then the pointer object is initialized to the right side in function block 460.

Regardless of which side has been selected, control is passed via label 480 to function block 500 of FIG. 5 where the length for displaying the pointer object is calculated. Function block 510 stores the entered data of each field in the dialog box, function block 520 locates an appropriate screen location for displaying the predicate, and a test is performed at decision block 530 to determine if the first predicate has been defined. If this is the first predicate, then the row condition window is presented in function block 540. If not, then control is passed to function block 550 where the predicate is displayed and a test is performed at decision block 560 to determine if the default settings are used. If no default settings are being used, then control passes via label 580 through label 610 of FIG. 6 to terminal 640 where control is returned to the calling program. If default settings are specified then control is passed via label 570 through label 600 to function block 620 where the root and node are displayed. Then, at function block 630, an object is created to link the root and the node and display the result to the user before passing control back to the calling routine at terminal 640.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for graphically forming a query relationship between a first object and a second object by direct manipulation comprising:
   (a) means for storing a plurality of objects including said first object and said second object in a database accessible by a user at a workstation;
   (b) pointer means at said workstation for selecting said first object for said query and said second object for said query form said plurality of objects in the database by said user using direct manipulation;
   (c) means for creating a logical relationship between the first object for said query selected by said user within the database and the second object for said query;
   (d) means for graphically displaying the logical relationship between the first object for said query and the second object for said query to said user on a display on said workstation, and
   (e) means for forming presentation objects representing data structures by storing user supplied information of the logical relationship of said first object and said second object in said data structures and displaying the logical relationship to said user at said workstation.

2. An apparatus as recited in claim 1, wherein the database is relational.

3. An apparatus as recited in claim 1, including means for creating predicate definitions by a user at said workstation by direct manipulation of a first object and a second object in said database.

4. An apparatus as recited in claim 1, wherein the presentation objects are formed by said first object and said second object through the logical relationship defined by said user at said workstation.

5. An apparatus as recited in claim 3, including means for graphically displaying the predicate definitions on a display to said user at said workstation.

6. An apparatus as recited in claim 3, including means for editing the predicate definitions by said user at said workstation by direct manipulation of said plurality of objects at said workstation.

7. A method for graphically forming a graphical query relationship between a first object and a second object by direct manipulation comprising:
   (a) storing information in a database for a plurality of objects including said first object and said second object in a database accessible by a user at a workstation;
   (b) selecting said first object for said query and said second object for said query form said plurality of objects in the database by said user using direct manipulation;
   (c) creating a logical relationship between the first object for said query selected by said user within the database and the second object for said query;
   (d) displaying the logical relationship between the first object for said query and the second object for said query to said user on a displays, and
   (e) forming presentation objects representing data structures by storing user supplied information on the logical relationship of said first object and said second object in said data structures and displaying the logical relationship to said user at said workstation.

8. A method as retired in claim 7, wherein the database is relational.

9. A method as recited in claim 7, including the step of creating predicate definitions by a user at said workstation by direct manipulation of a first object and a second object in said database.

10. A method as recited in claim 7, wherein the presentation objects are formed by said first object and said second object through said logical relationship defined by said user at said workstation.

11. A method as recited in claim 9, including the step of graphically displaying the predicate definitions on a display to said user at said workstation.

12. A method as recited in claim 9, including the step of editing the predicate definitions by said user at said workstation by direct manipulation of said plurality of objects at said workstation.

* * * * *

UNITED STATES PATENT AND TRADEMARK OFFICE
CERTIFICATE OF CORRECTION

PATENT NO. : 5,721,900
DATED : Feb. 24, 1998
INVENTOR(S) : Banning et al

It is certified that error appears in the above-identified patent and that said Letters Patent is hereby corrected as shown below:

Column 20, line 46, please delete "retired" and insert --recited--.

Signed and Sealed this

Third Day of August, 1999

Attest:

Q. TODD DICKINSON

Attesting Officer     Acting Commissioner of Patents and Trademarks